(12) United States Patent
Dzugan et al.

(10) Patent No.: US 12,530,635 B2
(45) Date of Patent: Jan. 20, 2026

(54) MACHINE LEARNING TECHNOLOGIES FOR PREDICTING DWELL TIME

(71) Applicant: Project44, LLC, Chicago, IL (US)

(72) Inventors: Matthew George Dzugan, Forest Park, IL (US); Asha Anju, Los Altos, CA (US)

(73) Assignee: PROJECT44, LLC, Chicago, IL (US)

( * ) Notice: Subject to any disclaimer, the term of this patent is extended or adjusted under 35 U.S.C. 154(b) by 56 days.

(21) Appl. No.: 17/946,834

(22) Filed: Sep. 16, 2022

(65) Prior Publication Data

US 2024/0095611 A1 Mar. 21, 2024

(51) Int. Cl.
*G06Q 10/04* (2023.01)
*G06N 20/20* (2019.01)
*G06Q 10/083* (2024.01)
*G06Q 10/0835* (2023.01)

(52) U.S. Cl.
CPC ............ *G06Q 10/04* (2013.01); *G06N 20/20* (2019.01); *G06Q 10/08355* (2013.01)

(58) Field of Classification Search
CPC ... G06Q 10/04; G06Q 10/08355; G06N 20/20
See application file for complete search history.

(56) References Cited

U.S. PATENT DOCUMENTS

| | | | |
|---|---|---|---|
| 2021/0125146 A1* | 4/2021 | Tazume | B64D 1/08 |
| 2021/0140775 A1* | 5/2021 | Siddique | G06N 20/00 |
| 2023/0290249 A1* | 9/2023 | Hunt | G01C 21/3453 |

OTHER PUBLICATIONS

Catherine Curtis, Machine Learning for Predicting Patient Wait Times and Appointment Delays, 2017, p. 1310-1316 (Year: 2017).*
International Application No. PCT/US2023/032988, International Search Report and Written Opinion, mailed Dec. 14, 2023.

* cited by examiner

*Primary Examiner* — Ibrahim N El-Bathy
(74) *Attorney, Agent, or Firm* — MARSHALL, GERSTEIN & BORUN LLP

(57) ABSTRACT

Systems, methods, and computer-readable medium storing instructions for using a machine learning to predict dwell times for shipments along routes are described herein. The method, system, or instructions may include training the machine learning model using training data, storing the machine learning model in a memory, accessing route data of a shipment of interest, analyzing the route data using the machine learning model, and, based on the analyzing of the route data, outputting a predicted dwell time at a stop of the shipment of interest.

12 Claims, 6 Drawing Sheets

| SHIPMENT OVERVIEW | | | | | STOP 1 | | | | | STOP N | | | |
|---|---|---|---|---|---|---|---|---|---|---|---|---|---|
| AGREEMENT # | PRODUCTS | ORIGIN | DESTINATION | ETA | STOP | STOP ETA | STOP ETD | DWELL TIME | | STOP | STOP ETA | STOP ETD | DWELL TIME |
| 325 | COFFEE | SEATTLE | LOS ANGELES | 12/1 | MEDFORD | 11/27 6:00 | 11/27 9:00 | 3 | | BAKERSFIELD | 12/1 4:00 | 12/1 10:00 | 6 |
| 581 | TOYS | TOLEDO | CHICAGO | 12/1 | FREMONT | 11/28 13:00 | 11/28 23:00 | 10 | CONTACT | GARY | 11/28 22:00 | 12/1 9:00 | 11 | CONTACT |
| 710 | MULCH | PORTLAND | ST. LOUIS | 12/1 | BOISE | 11/24 12:00 | 11/26 7:00 | 43 | 520 CONTACT | COLUMBIA | 11/30 23:00 | 12/1 6:00 | 7 | CONTACT |
| 992 | SMARTPHONES | BANGKOK | LOS ANGELES | 12/1 | SAN FRANCISCO | 11/29 23:00 | 11/30 6:00 | 7 | ! 530 CONTACT | PASADENA | 12/1 5:00 | 12/1 7:00 | 2 | CONTACT |
| 161 | HEAVY EQUIPMENT | PITTSBURGH | SAN JOSE | 12/1 | SAN FRANCISCO | 11/29 14:00 | 11/29 22:00 | 8 | CONTACT | OAKLAND | 11/30 20:00 | 12/1 7:00 | 11 | CONTACT |
| 602 | DISHWASHERS | SHANGHAI | COLUMBUS, OH | 12/2 | CLEVELAND | 11/30 21:00 | 12/1 8:00 | 11 | CONTACT | AKRON | 12/1 17:00 | 12/2 8:00 | 15 | CONTACT |

FIG. 5

MACHINE LEARNING TECHNOLOGIES FOR PREDICTING DWELL TIME

FIELD

The present disclosure is directed to improvements related to predicting dwell times at stops for shipments along routes. More particularly, the present disclosure is directed to platforms and technologies for using machine learning to analyze data associated with a shipment to predict how much time will elapse between the arrival of an asset at a stop and the subsequent departure of the asset from the stop.

BACKGROUND

The transportation and logistics industry is made up of various entities that contract or agree to handle the transportation of assets (e.g., physical items) between and among locations. In particular, the transportation and logistics industry generally includes carriers (i.e., entities that are engaged to move assets as shipments and may be in charge of the transportation of the shipment from an origin to a destination) and shippers (i.e., entities that engage the carriers to move the shipments). A shipment may be segmented into a multi-leg shipment (i.e., from an origin to a destination via at least one intermediate stop). The stops along a shipment may be owned and operated by the carrier entity, the shipper entity, or some other entity. At a stop, the asset may be unloaded from a first means of transportation onto a second means of transportation, which may be the same as or different in type than the first means of transportation. When a shipment arrives at a stop on the first means of transportation, it will often dwell at the stop for some time before departing from the stop on the second means of transportation. A dwell time is defined as an amount of time elapsed between the arrival of the shipment at a stop and the subsequent departure of the shipment from the stop.

Dwell time has important relevance to a number of areas of shipping, both related to trucks and other modes of transport (e.g., plane, train, boat, etc.). Currently, we can measure dwell time with high accuracy by determining the elapsed time of a shipment from arrival to departure of a stop. However, conventional techniques are limited with respect to predicting dwell time at a stop prior to departure from that stop and often rely on simple historical averages, which often do not provide enough insight to inform accurate predictions. For example, a shipment arriving to a stop at night after operating hours (e.g., of the stop) will likely not have the same dwell time as a shipment arriving to the same stop midday during operating hours. Therefore, the dwell time of shipments is in constant flux and is difficult to predict using the conventional techniques Accordingly, there is an opportunity for platforms and technologies to leverage data sources and data analyses techniques to effectively and accurately predict dwell tines for shipments along routes.

SUMMARY

In an embodiment, a computer-implemented method of using machine learning to predict dwell times for shipments along routes is provided. The method may include: training, by one or more computer processors, a machine learning model using at least: (i) training route data of one or more training routes, and (ii) training dwell time data corresponding to the training route data; storing the machine learning model in a memory; accessing, by the one or more computer processors, route data including a stop along a route for a shipment of interest; analyzing, by the one or more computer processors using the machine learning model, the route data that includes the stop; and based on the analyzing of the route data, outputting, by the machine learning model, a predicted dwell time at the stop along the route for the shipment of interest.

In another embodiment, a system for using machine learning for transportation assignment is provided. The program memory may store executable instructions that, when executed by the one or more processors, cause the computer system to: train a machine learning model using at least: (i) training route data of one or more training routes, and (ii) training dwell time data corresponding to the training route data, store the machine learning model in the program memory, access route data including a stop along a route for a shipment of interest, analyze, using the machine learning model, the route data that includes the stop, and based on the analyzing of the route data, output, by the machine learning model, a predicted dwell time at the stop along the route for the shipment of interest.

Further, in an embodiment, a tangible, non-transitory computer-readable medium storing executable instructions for using machine learning to predict dwell times for shipments along routes is provided. The executable instructions, when executed by one or more processors of a computer system, cause the computer system to: train a machine learning model using at least: (i) training route data of one or more training routes, and (ii) training dwell time data corresponding to the training route data; store the machine learning model in a memory; access route data including a stop along a route for a shipment of interest; analyze, using the machine learning model, the route data that includes the stop; and based on the analyzing of the route data, output, by the machine learning model, a predicted dwell time at the stop along the route for the shipment of interest.

BRIEF DESCRIPTION OF THE FIGURES

FIG. 5 depicts an exemplary dashboard interface for displaying shipping information, in accordance with some embodiments.

DETAILED DESCRIPTION

Figure 1:
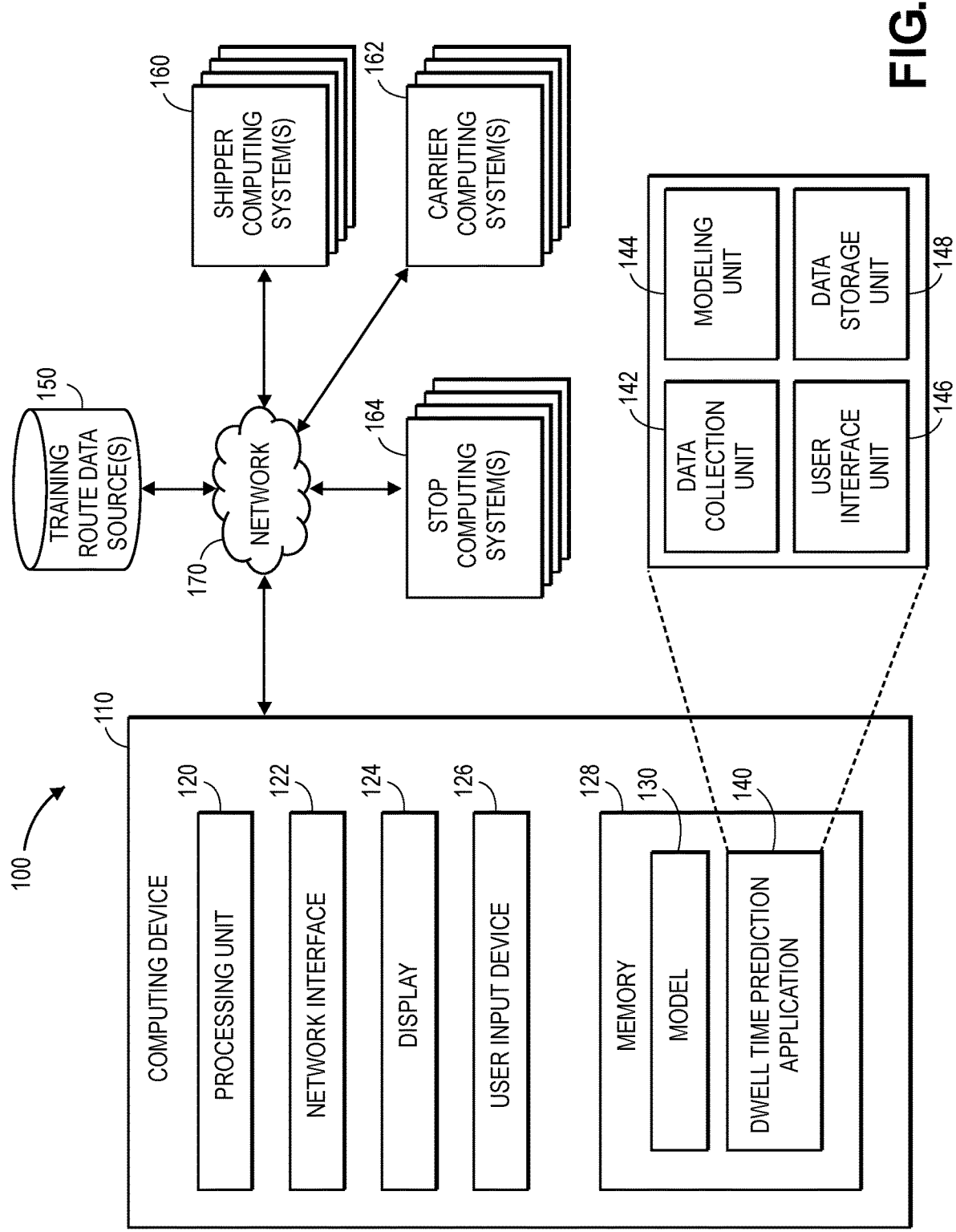
FIG. 1 depicts a simplified block diagram of an exemplary system for using machine learning to predict dwell times for stops of shipments along routes, in accordance with some embodiments.

The present embodiments may relate to, at least in part, analyzing various data associated with a particular shipment using a machine learning model to predict one or more dwell times for one or more stops along the shipments. According to certain embodiments, systems, methods, and computer-readable media may initially train the machine learning model using training data, and store the machine learning model in memory for subsequent use.

Subsequent to a shipping agreement for a set of products being reached between a carrier and a shipper, the systems, methods, and instructions may interface with one or more external systems to receive various data associated with the shipment, including route data that may be associated with one or more of: a shipper, a carrier, a stop location, a stop arrival time, or a total number of stops, as will be described in more detail herein. The systems and methods may input the route data into the machine learning model, which may output one or more predicted dwell times for one or more stops.

The systems, methods, and computer-readable media may update the route data, and may enable a user (e.g., the carrier, the shipper, an operator of a stop) to access a dashboard or other interface that informs of the status of and other information associated with the shipment. For example, predicted dwell times may be displayed on a dashboard. According to certain embodiments, the systems and methods may perform the analyses without use of a machine learning model.

The systems, methods, and computer-readable media therefore offer numerous advantages. In particular, the systems, methods, computer-readable media use machine learning or artificial intelligence techniques to effectively and accurately predict dwell times of a shipment and generate communications indicating the prediction. Thus, the systems, methods, and computer-readable media enable users to access and review dwell times of a shipment, and enable the users to determine and make adjustments or other actions to account for any delays in the dwell times that impact the shipment, additional shipments, or general business operations. It should be appreciated that additional benefits are envisioned.

The systems, methods, and computer-readable media discussed herein address a technical challenge, for example, a technical challenge related to improving shipping logistics. In conventional platforms, dwell time predictions are typically based on pure historical averages that do not discern based on details of a shipment's specific route data. In contrast, the systems, methods, and computer-readable media are able to ingest or access route data from multiple data sources and analyze the route data to assess how the shipment is progressing and predict the dwell times of the shipment, thus enabling users to gain insight into dwell times more effectively and efficiently manage operations.

Therefore, the systems, methods, and computer-readable media do not merely recite the performance of some business practice known from the pre-Internet world (tracking a shipment) along with the requirement to perform it on the Internet. Instead, the systems and methods incorporate computer networks that enable communications among carrier entities, shipper entities, and stop entities as well as data sources such as electronic logging devices (e.g., GPS locators), among other entities and components. Thus, the systems, methods, and computer-readable media are necessarily rooted in computer technology in order to overcome a problem specifically arising in logistics technologies.

According to implementations, the systems, methods, and computer-readable media may support a dynamic, real-time or near-real-time collection, analysis, and communication of any route data that may be associated with conditions related to a shipment. In particular, the systems, methods, and computer-readable media may dynamically and automatically access or retrieve route data indicative of operational conditions, analyze the route data, and output predicted dwell times. In these ways, the systems, methods, and computer-readable media discussed herein address technical challenges, namely establishing dynamic data collection, analysis, and communication across dedicated computer systems, including different systems for different carrier entities, shipper entities, and stop entities.

Exemplary System

FIG. 1 is a simplified block diagram of an example system 100 for using machine learning to predict dwell times for stops of shipments along routes. In some embodiments, the system 100 may include standalone equipment, though in other examples the system 100 may be incorporated into other equipment. At a high level, the system 100 includes components of a computing device 110, one or more training route data sources 150, one or more shipper computing systems 160, one or more carrier computing systems 162, and one or more stop computing systems 164. One or more of the components of the system 100 may be communicatively coupled using, for example, wired (e.g., via wires/cables, an address/data bus, or other suitable means) or wireless means. In FIG. 1, the computing device 110, the training route data sources 150, the shipper computing systems 160, the carrier computing systems 162, and the stop computing systems 164 are communicatively coupled via a network 170, which may be or include a proprietary network, a secure public internet, a virtual private network, or any other type of suitable network (e.g., dedicated access lines, satellite links, cellular data networks, combinations of these, etc.). In embodiments where the network 170 comprises the Internet, data communications may take place over the network 170 via an Internet communication protocol. In some embodiments, more or fewer instances of the various components of the system 100 than are shown in FIG. 1 may be included in the system 100 (e.g., one instance of the computing device 110, two instances of the training route data sources 150, one hundred instances of the shipper computing systems 160, etc.). It should be appreciated that the system 100 is merely exemplary and that alternative or additional components are envisioned.

As noted above, the system 100 includes one or more training route data sources 150 as well as the one or more systems 160-164. One or more of the training route data sources 150 or the systems 160-164 may provide information to the computing device 110 via the network 170. The provided information may be data, such as nominal data, ordinal data, discrete data, or continuous data. The provided information may be in the form of a suitable data structure, which may be stored in a suitable format, such as of one or more of: JSON, XML, CSV, etc. One or more of the training route data sources 150 or the systems 160-164 may provide information to the computing device 110 automatically, or in response to a request. For example, a user of the computing device 110 may wish to train a model for predicting dwell times at stops of shipments along routes. In response, the training route data sources 150 may send information to the computing device 110 via the network 170. One or more of the training route data sources 150 or the systems 160-164 may be databases of information themselves or may be configured to receive information, such as via user input or from other external sources (e.g., server databases). One or more of the training route data sources 150 or the systems 160-164 may be publicly-accessible; for example, the training route data sources 150 may include historical data/information from publicly-accessible research studies or literature.

The training route data sources 150 generally include training data that may be used when training a model for predicting dwell times at stops of shipments along routes. The training data may include (i) training route data of one or more training routes, and (ii) training dwell time data corresponding to the training route data. It is worth noting that at least some of the training data may be either real-world data, such as observed data, or simulated data and may be labeled data.

The training route data may correspond to the one or more training routes and each of the training routes may be comprised of one or more training shipments. For each of the training shipments, the training route data may include information about: an origin of the training shipment (e.g., a location of the origin, an estimated time of departure from the origin, an actual time of departure from the origin, conditions at the origin, etc.), a destination of the training shipment (e.g., a location of the destination, an estimated time of arrival to the destination, an actual time of arrival to the destination, conditions at the destination, etc.), stops of the training shipment (e.g., number of stops, locations of the stops, estimated times of arrival to the stops, actual times of arrival to the stops, conditions at the stops, estimated time of departure from the stops, actual time of departure from the stops, etc.), distances of the training shipment (e.g., distance from the origin to the destination, distances between the stops, etc.), asset of the training shipment (e.g., types of the asset, size of the asset, weight of the asset, value of the asset, etc.), shipper of the training shipment (e.g., company that is the shipper, size of the shipper, location of the shipper, etc.), carrier of the training shipment (e.g., company that is the carrier, size of the carrier, location of the carrier, previous performance of the carrier, etc.), stops of the training shipment (e.g., company that is the operator of a stop, operating hours of a stop, location of a stop, conditions at a stop, etc.), or other information about the training shipment which may affect dwell times of the training shipment. It is worth noting for each of the previously-mentioned times of the training shipment (e.g., "the estimated time of departure from the origin," "actual time of arrival to the destination," etc.), the times may refer to one or more of a date, a day of the week, a date in relation to a holiday, a time of day, a time in relation to operating hours, etc. It is also worth noting for each of the previously-mentioned conditions of the training shipment (e.g., "the conditions at the origin," "the conditions at the stops," etc.), the conditions may refer to one or more of weather conditions, temperature conditions, open/closed conditions, busyness conditions (e.g., how many other shipments are coming through), labor conditions (e.g., how many laborers are available), etc.

The training dwell time data may correspond each stop along a training shipment of the training routes. Each of the training dwell times may be a measure of the elapsed time between when an asset of the training shipment arrives at a stop of the training shipment and when the asset departs the stop. Arrival and departure at a stop may be determined based on a geofence around the stop. The geofence may be a virtual boundary defined through one or more of: a 360-degree radius of direct ("crow-flies") distance around a set of coordinates, a specifically drawn outline defined either by a user or programmatically (e.g., a perimeter around property lines), or some other suitable virtual boundary. A stop may be defined according to a set of coordinates and may have a corresponding geofence. Accordingly, the asset may be determined to have arrived at the stop when GPS pings received from the asset indicate it is within the coordinates or the geofence boundary around the stop. The asset may be determined to have departed from the stop when the previous GPS ping received from the asset indicates the asset is inside the coordinates or the geofence, but the present GPS ping indicates the asset is now outside the coordinates or the geofence. The GPS ping may be a transmission at a specific point in time of coordinates where the asset is located and may comprise a location indication (e.g., latitude, longitude, etc.) and a timestamp. The training dwell times may be measured in one or more of a number of days, hours, minutes, seconds, or other suitable measurements of time (e.g., duration windows, duration/duration windows with probabilities, etc.).

The training data may not just have information about individual training shipments of training routes, but may instead have aggregated training route data and aggregated training dwell time data. Aggregation may be done as medians, means, standard deviations, ranges, percentiles, etc. of the training route data and the training dwell time data. Aggregating the training route data and the training dwell time data may include grouping the training route data and the training dwell time data according to certain parameters or characteristics of the two datasets. Groupings of the training route data and the training dwell time data for aggregation may be based on routes (e.g., same or similar origin, destination, stops, etc.), conditions (e.g., same or similar weather conditions, labor conditions, etc.), times (e.g., same or similar proximity to holidays or times in relation operating hours), carrier/shipper (e.g., same or similar carrier/shipper companies), assets (e.g., characteristics of the assets, etc.). For example, the training data may include that assets under 40 lbs., when shipped along a route from Southern California to the Pacific Northwest during Thanksgiving week, will have an average dwell time of 6 hours at a stop in Northern California if arriving outside of operating hours of the stop and 2 hours if arriving inside operating hours of the stop. In another example, the training data may include that assets shipped by Carrier Alpha will have a dwell time of at least 5 hours when arriving at a stop in Austin, Texas at approximately 23:00. In another example, the training data may include that 80% of assets arriving at any stop in the United States will have a dwell time of between 2 hours and 2 days. In another example, the training data may include that a mean dwell time for a stop in Michigan during a snowstorm is 1 day with a standard deviation of 8 hours, provided that the stop is operating with at least 70% of its typical labor force.

The systems 160-164 may be generally used to collect and transmit route data to the computing device that may be used by a model for predicting dwell times at stops for shipments of interest. The route data may include information/data that is associated with one or more of: a shipper, a carrier, a stop location, a stop arrival time, or a total number of stops. More specifically, the route data of the shipment may include information/data that represents or describes: an origin of the shipment (e.g., a location of the origin, an estimated time of departure from the origin, an actual time of departure from the origin, conditions at the origin, etc.), a destination of the shipment (e.g., a location of the destination, an estimated time of arrival to the destination, an actual time of arrival to the destination, conditions at the destination, etc.), stops of the shipment (e.g., number of stops, locations of the stops, estimated times of arrival to the stops, actual times of arrival to the stops, conditions at the stops, estimated time of departure from the stops, actual time of departure from the stops, etc.), distances of the shipment (e.g., distance from the origin to the destination, distances between the stops, etc.), assets of the shipment (e.g., types of the asset, size of the asset, weight of the asset, value of the asset, etc.), shipper of the shipment (e.g., company that is the shipper, size of the shipper, location of the shipper, etc.), carrier of the shipment (e.g., company that is the carrier, size of the carrier, location of the carrier, previous performance of the carrier, etc.), stops of the shipment (e.g., company that is the operator of a stop, operating hours of a stop, location of a stop, conditions at a stop, etc.), or other information about the shipment which may affect dwell times of the shipment. It is worth noting for each of the previously-mentioned times of the shipment (e.g., "the estimated time of departure from the origin," "actual time of arrival to the destination," etc.), the times may refer to one or more of a date, a day of the week, a date in relation to a holiday, a time of day, a time in relation to operating hours, etc. It is also worth noting for each of the previously-mentioned conditions of the training shipment (e.g., "the conditions at the origin," "the conditions at the stops," etc.), the conditions may refer to one or more of weather conditions, temperature conditions, open/closed conditions, busyness conditions (e.g., how many other shipments are coming through), labor conditions (e.g., how many laborers are available), etc. Furthermore, any of the data in the route data may be represented as a single value (e.g., 5:00 PM Pacific Time on May 12, 24.5 miles until the upcoming stop, 4 stops in total, 13 lb. asset, etc.), a range of values (e.g., between 5:00 PM and 7:00 PM Pacific Time on May 12, at least 24.5 miles until the upcoming stop, no more than 4 stops in total, 13±0.5 lb. asset, etc.), or a single/range of values with a probability (e.g., 70% probability of before 7:00 PM on May 12, more likely than not less than 25 miles, most likely 4 stops, approximately 13 lb. asset, etc.).

Turning first to the shipper computing systems 160, the shipper computing systems may collect data about a shipper corresponding to the shipment of interest and provide the data to the computing device (e.g., via the network 170) as route data. For example, the shipper computing systems 160 may provide information about the shipper, such as the size of the shipper, the location of the shipper, etc. The shipper computing systems 160 may provide information about the origin and the destination of the shipment such as a location of the origin, an estimated time of departure from the origin, a location of the destination, etc. The shipper computing systems 160 may be maintained by one or more shippers who may be companies, corporations, businesses, entities, individual, groups of individuals, or the like that may manufacture, supply, or otherwise have access to physical goods, supplies, materials, animals, or other items (generally, "physical goods") capable of being physically transported.

Turning next to the carrier computing systems 162, the carrier computing systems may collect data about a carrier corresponding to the shipment of interest and provide the data to the computing device (e.g., via the network 170) as route data. For example, the carrier computing systems 162 may provide information about the carrier such as the size of the carrier, the location of the carrier, performance history (e.g., order fulfillment rate, on-time delivery rate, etc.) of the carrier, etc. The carrier computing systems 162 may provide information about the route of the shipment such as conditions at the origin, estimated time of arrival to the destination, actual time of arrival to the destination, conditions at the destination, number of stops, locations of the stops, estimated times of arrival to the stops, distance from the origin to the destination, distances between the stops, etc. The carrier computing systems 162 may be maintained by one or more carriers who may be companies, corporations, businesses, entities, individual, groups of individuals, or the like that may physically transport goods, supplies, materials, animals, or other items (generally, "physical goods") capable of being physically transported. The transportation of goods may be accomplished via marine or water (i.e., using boats or ships), air (i.e., using aircraft), rail (i.e., using trains), or road (i.e., using trucks, cars, or other land-based vehicles). The term "vehicle," as used herein, may refer to any vessel or craft capable of transporting goods via marine or water, air, rail, or road.

Turning next to the stop computing systems 164, the stop computing systems may collect data about a stop corresponding to the shipment of interest and provide the data to the computing device (e.g., via the network 170) as route data. For example, the stop computing systems 164 may provide information about the stop such as the locations of the stop, actual time of arrival to the stops, hours of operation αt the stop, busyness conditions of the stop, open/closed conditions of the stop, labor conditions of the stop, weather conditions of the stop, temperature conditions of the stop, past performance data of the stop, etc. The stop computing systems 164 may be maintained by one or more operators of a stop who may be companies, corporations, businesses, entities, individual, groups of individuals, or the like that may physically receive and store shipments of goods, supplies, materials, animals, or other items (generally, "physical goods") capable of being physically transported. In some embodiments, the stop may be operated by the carrier entity, while in other embodiments, the stop may be operated by an entity that is not the carrier entity.

Not only may the systems 160-164 be used for collecting and transmitting route data via the network 170 to the computing device 110 such that the computing device 110 may predict dwell times at stops for shipments of interest, but the systems 160-164 may also be used for communicating amongst each other. For example, the shipper computing systems 160 may be configured to provide (e.g., via the network 170) shipping instructions and payment information to the carrier computing systems 162 so that a carrier may commence shipment of an asset on behalf of a shipper. In another example, the carrier computing systems 162 may be configured to receive (e.g., via the network) confirmation from the stop computing systems 164 when assets have arrived at and departed from a stop. In another example, the stop computing systems 164 may be configured to alert (e.g., via the network) the shipper computing systems 160 and the carrier computing systems 162 of any delays that might increase dwell time at a stop.

In some embodiments, the systems 160-164 may interface and communicate with a transportation management system (TMS) (not shown). According to embodiments, the TMS may be any of a general transportation management system, warehouse management system (WMS), order management system (OMS), enterprise resource planning (ERP) system, or otherwise a system that may be used to manage freight. Generally, the TMS may at least partly facilitate shipping agreements between shippers, carriers, and operators of stops, thereby facilitating route planning and optimization, load optimization, execution, freight audit and payment, yard management, advanced shipping, order visibility, and carrier management. The TMS may be an open-source system or may be proprietary to any of the carriers. According to some embodiments, the TMS may support specific and particular communication capabilities with the other entities of the system 100. In particular, the TMS may support communication with the other entities via different components and protocols. For example, the TMS may support communication with the computing device 110.

In some embodiments, the system 100 may omit one or more of the training route data sources 150 or the systems 160-164, and instead the computing device 110 may receive data/information locally, such as via user input. Techniques for receiving data/information corresponding to the training route data sources 150 or the systems 160-164 without using the training route data sources 150 or the systems 160-164 are further described and illustrated, for example, directly at the computing device 110.

Referring now to the computing device 110, the computing device 110 may be included in the system 100. The computing device 110 may include a single computing device, or multiple computing devices that are either co-located or remote from each other. The computing device 110 is generally configured to analyze, using a model 130 trained using training route data, route data including a stop along a route for a shipment of interest to output a predicted dwell time at the stop along the route for the shipment of interest.

Components of the computing device 110 may be interconnected via an address/data bus or other means. The components included in the computing device 110 may include a processing unit 120, a network interface 122, a display 124, a user input device 126, and a memory 128, discussed in further detail below.

The processing unit 120 includes one or more processors, each of which may be a programmable microprocessor that executes software instructions stored in the memory 128 to execute some or all of the functions of the computing device 110 as described herein. Alternatively, one or more of the processors in the processing unit 120 may be other types of processors (e.g., application-specific integrated circuits (ASICs), field-programmable gate arrays (FPGAs), etc.).

The network interface 122 may include any suitable hardware (e.g., front-end transmitter and receiver hardware), firmware, or software configured to use one or more communication protocols to communicate with external devices or systems (e.g., the plunger depth sensors 150, the syringe filling systems 140, the product parameter sources 160, etc.). For example, the network interface 122 may be or include an Ethernet interface. Using the network interface 122, the computing device 110 may be able to communicate with any device(s) via a single communication network, or via multiple communication networks of one or more types (e.g., one or more wired or wireless local area networks (LANs), or one or more wired or wireless wide area networks (WANs) such as the Internet or an intranet, etc.).

The display 124 may use any suitable display technology (e.g., LED, OLED, LCD, etc.) to present information to a user, and the user input device 126 may be a keyboard or other suitable input device. In some embodiments, the display 124 and the user input device 126 are integrated within a single device (e.g., a touchscreen display). Generally, the display 124 and the user input device 126 may combine to enable a user to interact with graphical user interfaces (GUIs) or other (e.g., text) user interfaces provided by the computing device 110 (e.g., for purposes such as displaying data/information, recommending changes to one or more vacuum parameters, notifying users of equipment faults or other deficiencies, etc.).

The memory 128 includes one or more physical memory devices or units containing volatile or non-volatile memory, and may or may not include memories located in different computing devices of the computing device 110. Any suitable memory type or types may be used, such as read-only memory (ROM), solid-state drives (SSDs), hard disk drives (HDDs), etc. The memory 128 may store (i) the model 130, and (ii) instructions of one or more software applications included in a dwell time prediction (DTP) application 140 that can be executed by the processing unit 120. In the example system 100, the DTP application 140 includes a data collection unit 142, a modeling unit 144, a user interface unit 146, and a data storage unit 148. The units 142-148 may be distinct software components or modules of the DTP application 140, or may simply represent functionality of the DTP application 140 that is not necessarily divided among different components/modules. For example, in some embodiments, the data collection unit 142 and the user interface unit 146 are included in a single software module. Moreover, in some embodiments, the units 142-148 are distributed among multiple copies of the DTP application 140 (e.g., executing at different components in the computing device 110), or among different types of applications stored and executed at one or more devices of the computing device 110.

In general, a computer program product such as the DTP application 140 may operate having computer-readable program code embodied therein, wherein the computer-readable program code may be adapted to be executed by the processing unit 120 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML, R, Stata, AI libraries). In some embodiments, the computer program product may be part of a cloud network of resources.

The model 130 may be any suitable model for predicting dwell times for shipments along routes. In some embodiments, and as discussed further below, the model 130 may be trained using at least some of the system 100 (e.g., the training route data sources 150), or, in some embodiments, the model 130 may be pre-trained (i.e., trained prior to being obtained by the system 100). The model 130 may be trained using training data including: (i) training route data of one or more training routes, and (ii) training dwell time data corresponding to the training route data. In some embodiments, the model 130 may include a statistical model that may be parametric, nonparametric, or semiparametric. One suitable example of a statistical model which may be included in the model 130 is a linear regression model. In other embodiments, the model 130 includes a machine learning model. In some embodiments, the machine learning model may be suited for regression or classification tasks, such as via a decision tree (e.g., a gradient boosted decision tree). In some embodiments, the model 130 may employ a neural network, such as a convolutional neural network or a deep learning neural network. Other examples of machine-learning models in the model 130 are models that use support vector machine (SVM) analysis, K-Nearest neighbor analysis, naïve Bayes analysis, clustering, reinforcement learning, or other machine-learning algorithms or techniques. Machine learning models included in the model 130 may identify and recognize patterns in training data in order to facilitate making predictions for new data.

The data collection unit 142 is generally configured to receive data. In some embodiments, the data collection unit 142 receives the training data (including, for example, (i) training route data of one or more training routes, and (ii) training dwell time data corresponding to the training route data). The data collection unit 142 may receive the training data via, for example, the training route data sources 150, user input received via the user interface unit 146 with the user input device 126, or other suitable means. In some embodiments, the data collection unit 142 may receive the route data including a stop along a route for a shipment of interest via, for example, one or more of the systems 160-164, user input received via the user interface unit 146 with the user input device 126, or other suitable means. In some embodiments the route data may be collected via sensors (at, e.g., one or more of the systems 160-164) and may be automatically transmitted for collection at the data collection unit 142.

The modeling unit 144 is generally configured to generate, train, or apply the model 130. The modeling unit 144 may train the model 130 using the training data (including, for example, (i) training route data of one or more training routes, and (ii) training dwell time data corresponding to the training route data), provided, for example via the training route data sources 150. The modeling unit 144 may also apply the model 130 when evaluating impacts of processing time of a process (e.g., a bioprocess). More specifically, the modeling unit 144 may analyze, using the model 130, the route data including a stop along a route for a shipment of interest to output a predicted dwell time at the stop along the route for the shipment of interest. In some embodiments, the model 130 may be trained by a device or system outside the system 100 and instead the modeling unit 144 only applies inputs to the model 130 and is not involved in training the model 130.

The user interface unit 146 is generally configured to receive user input. In one example, the user interface unit 146 may generate a user interface for presentation via the display 124, and receive, via the user interface and user input device 126, user input for training data (including, for example, (i) training route data of one or more training routes, and (ii) training dwell time data corresponding to the training route data) to be used by the modeling unit 144 when training the model 130. In another example, the user interface unit 146 may receive, via a user interface and user input device 126, the input(s) to be used by the modeling unit 144 when applying the model 130 (e.g., the route data including the stop along the route for the shipment of interest). The user interface unit 146 may also be used to display information. For example, the user interface unit 146 may be used to display the predicted output (e.g. the predicted dwell time at the stop along the route for the shipment of interest).

The data storage unit 148 is generally configured to store the predicted output determined by the modeling unit 144 (e.g. the predicted dwell time at the stop along the route for the shipment of interest). The data storage unit 148 may store the predicted output in the memory 128, or in a different suitable memory (e.g., in an external database or on a computer system not shown). In some embodiments, the data storage unit 148 also stores other information, such as the model inputs that correspond to predicted model outputs.

The operation of each of the units 142-148 is described in further detail below, with reference to the operation of the system 100.

Exemplary Dwell Time Timeline

Figure 2:
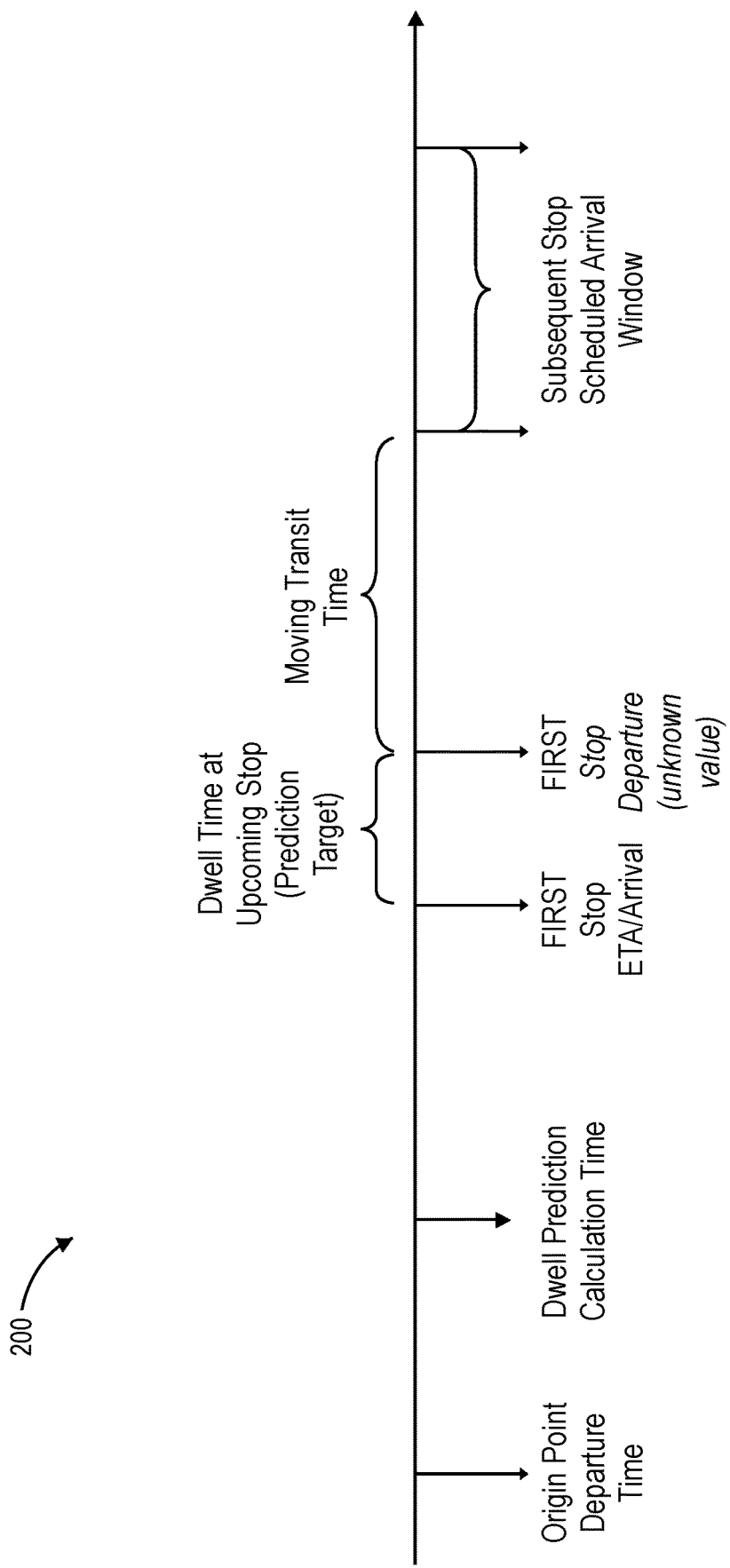
FIG. 2 depicts an exemplary shipping timeline, in accordance with some embodiments.

FIG. 2 depicts an exemplary timeline 200 starting with departure from an origin and finishing with arrival at a subsequent stop. As previously discussed, an asset may be picked up by a carrier as a shipment from the origin on behalf of the shipper. The origin may be co-located with either the shipper or the carrier, or at some other location. In some embodiments, timeline 200 may be purely illustrative of an exemplary shipping timeline; however, in other embodiments the timeline 200, or a representation of the timeline 200, may be displayed on a graphical user interface (e.g., the display 124 of the computing device 110).

Once the shipment leaves the origin, the shipment may be transported to a first stop. The shipment may have an estimate time of arrival (ETA) to the first stop that may be estimated by the carrier, the shipper, or some other third-party. Predicting the ETA of the shipment may be based on a number of factors including one or more of distance between the origin and the first stop, conditions along the route from the origin to the first stop (e.g., weather conditions, traffic conditions, etc.), speed to be traveled at along the route from the origin to the first stop, or other conditions used to estimate ETA for traveling from one location to another. While ETA of the shipment to the first stop may be a more conventionally-understood process, predicting the dwell time (i.e., how much time will elapse between the arrival of the shipment to the first stop and the subsequent departure of the shipment from the first stop) is the focus of the present techniques, as will be discussed in detail throughout.

As illustrated, the timeline 200 shows that the dwell time for the first stop is predicted (e.g., by the computing device 110) while the shipment is in transit from the origin to the first stop. Although the dwell time for the first stop may be predicted while the shipment is in transit from the origin to the first stop, it should be understood that, more generally, the dwell time may be predicted any time before the shipment departs from the first stop. For example, the dwell time at the first stop may be predicted before the asset is picked up from the origin. In another example, the dwell time may be predicted while the shipment is currently at the first stop and waiting to depart from the first stop. It should also be understood that the dwell time may be predicted more than once along the timeline 200, each time using more up-to-date data to inform the prediction. For example, the dwell time may be predicted a first time before the shipment leaves the origin, then the dwell time may be predicted a second time once the shipment is in transit to the first stop, then the dwell time may be predicted a third time shortly after arrival of the shipment to the first stop, and then the dwell time may be predicted a fourth time after the shipment has been sitting at the first stop for some later amount of time. In some examples, one or more dwell times along a shipment may be predicted and updated in real-time as the shipment progresses, constantly updating the dwell time as new information/data is received.

As further illustrated on the timeline 200, a moving transit time between the first stop and the subsequent stop may be known (using similar methods as predicting the ETA to the first stop). With the predicted moving transit time known, the subsequent stop arrival time will depend on the dwell time at the first stop. As such, a subsequent stop scheduled arrival time window may be predicted (e.g. by the computing device 110) that will cover a range of values. However, once the dwell time is predicted (e.g. by the computing device 110), a more precise prediction (e.g., a single time or a smaller window of times than the original subsequent stop scheduled arrival time window) of the subsequent stop arrival time may be generated.

Exemplary Deep Learning Artificial Neural Network

Figure 3:
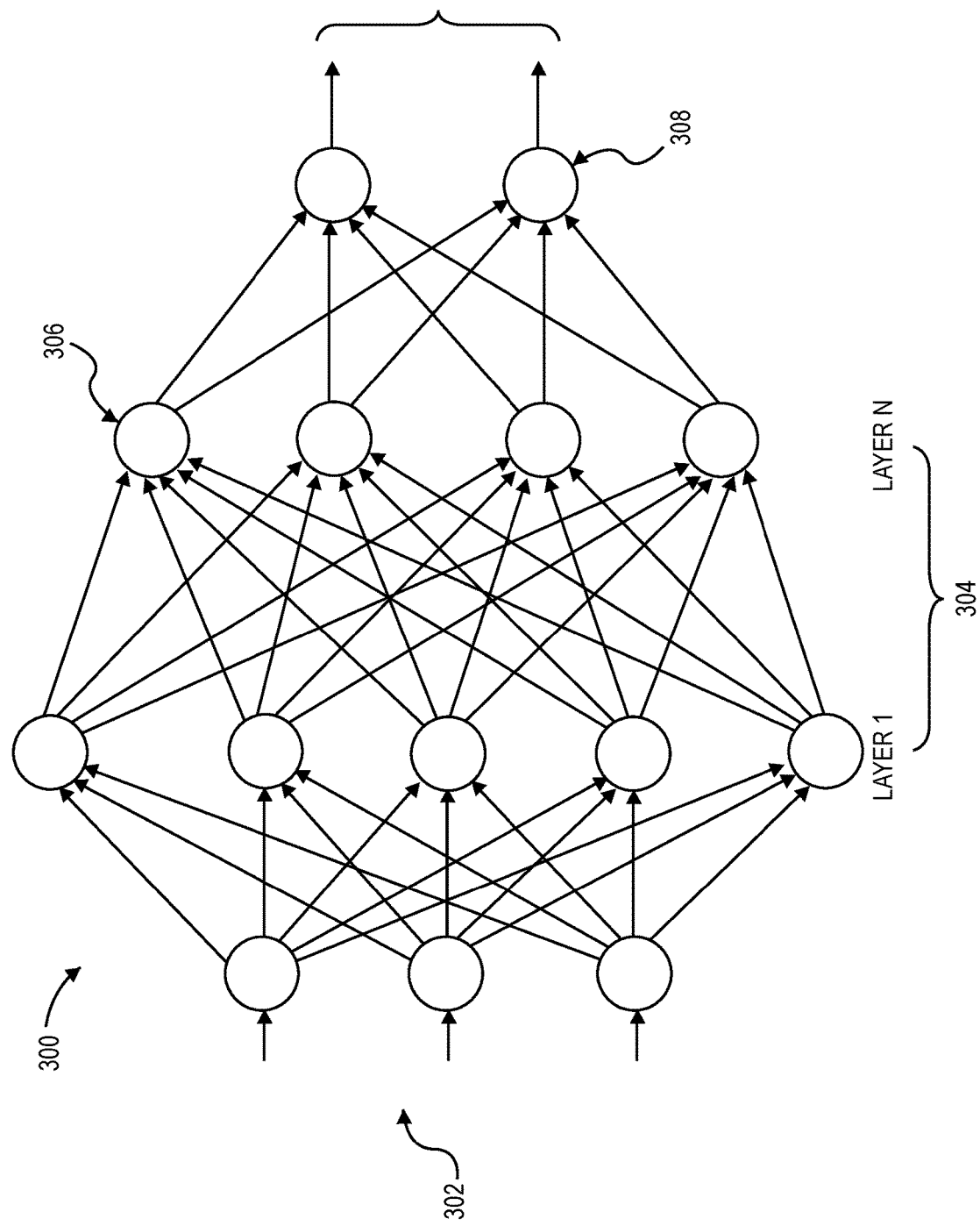
FIG. 3 depicts an exemplary machine learning model that may be employed by the systems, methods, and instructions in accordance with some embodiments.

FIG. 3 depicts an exemplary machine learning model 300, which may be used in conjunction with the machine learning techniques as discussed herein. The model 300 may be trained or operated by the modeling unit 144 of FIG. 1, for example. The model 300 may be the same as or similar to the model 130 of FIG. 1. The model 300 may include a plurality of layers, each of which may include any number of respective neurons, or nodes.

As illustrated, the model 300 may be a convolutional neural network, more specifically a deep learning convolutions neural network (DNN). The model 300 may include an input layer 302, one or more hidden layers 304, and an output layer 308. Each of the layers in the model 300 may include an arbitrary number of neurons. The plurality of layers may chain neurons together linearly and may pass output from one neuron to the next, or may be networked together such that the neurons communicate input and output in a non-linear way. In general, it should be understood that many configurations or connections of the model 300 are possible.

The input layer 302 may correspond to a large number of input parameters (e.g., one million inputs), in some embodiments, and may be analyzed serially or in parallel. Further, various neurons or neuron connections within the model 300 may be initialized with any number of weights or other training parameters. Each of the neurons in the hidden layers 304 may analyze one or more of the input parameters from the input layer 302, or one or more outputs from a previous one or more of the hidden layers 304, to generate a decision 310 or other output. The output layer 308 may generate the decision 310 or more outputs, each indicating a prediction or an expected value. The number of input neurons may be stored as a predetermined value, and used to initialize a network for training.

In some embodiments or scenarios, the output layer 308 may include only a single output 310. For example, a neuron may correspond to one of the neurons in a hidden layer 306. Each of the inputs to the neuron may be weighted according to a set of weights W1 through Wi, determined during the training process (for example, if the neural network is a recurrent neural network) and then applied to a node that performs an operation $\alpha$. The operation $\alpha$ may include computing a sum, a difference, a multiple, or a different operation. In some embodiments weights are not determined for some inputs. In some embodiments, neurons of weight below a threshold value may be discarded/ignored. The sum of the weighted inputs, r1, may be input to a function which may represent any suitable functional operation on r1. The output of the function may be provided to a number of neurons of a previous/subsequent layer or as an output 310 of the model 300. In some embodiments, the model 300 may include one or more convolutional neural network (CNN) layers.

While a convolutional neural network is illustrated in the model 300, one or more other types of machine learning models or techniques may be employed by, for example the DTP application 140 to predict dwell times for one or more stops along a route of a shipment. For example, the machine learning model may be a gradient-boosted random forest of decision trees. As will be appreciated by one having ordinary skill in the art, gradient-boosting is a machine learning technique used, for example, in regression and classification tasks that may be applied to conventional random forest models. Gradient boosting generates a predictive model in the form of an ensemble of weak predictive models, which may be decision trees. When a decision tree is the weak learner, the resulting algorithm may be called a gradient-boosted tree. The gradient boosted decision tree may be appreciated as often outperforming a conventional random forest model. While the gradient-boosted trees model is built in a stage-wise fashion as in other boosting methods, it generalizes the other boosting methods by allowing optimization of an arbitrary differentiable loss function.

In further embodiments, the machine learning model may be trained using a supervised or unsupervised machine-learning program or algorithm. The machine-learning program or algorithm may employ a combined learning module or program that learns in two or more features or feature datasets in a particular areas of interest. In one embodiment, a generative adversarial neural network may be used. In other embodiments, the machine-learning programs or algorithms may include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, or other machine-learning algorithms or techniques. Machine-learning may involve identifying and recognizing patterns in existing data in order to facilitate making predictions for subsequent data. In some embodiments, due to the processing power requirements of training machine learning models, the selected model may be trained using additional computing resources (e.g., cloud computing resources) based upon data provided by one or more servers. The training data may be unlabeled, or the training data may be labeled, such as by a human.

Training of the machine learning model may continue until the machine learning model is validated and satisfies selection criteria to be used as a predictive model for dwell times of stops along routes of shipments. In one embodiment, the machine learning model may be validated using holdout data that is a second subset of the training data to determine algorithm accuracy and robustness. The holdout data may include route data and may be labeled with actual dwell times corresponding to the route data. Validation may include applying the machine learning model to the holdout data to output predicted dwell times corresponding to the route data. The machine learning model may then be evaluated to determine whether the machine learning model performance is sufficient based upon a comparison of the predicted dwell times with the actual dwell times. Sufficiency criteria applied in the evaluation may vary depending upon the size of the training data available for training, the performance of previous iterations of scoring algorithms, or user-specified performance requirements. If the machine learning model does not meet the sufficiency criteria, the machine learning model may be adjusted in one or more manners. For example, one or more weights of the machine learning model may be adjusted, the machine learning model may train on additional training data (e.g., route data), a different architecture or type of machine learning model may be selected, or some other suitable change to the machine learning model.

In some embodiments, the machine learning model may include multiple sub-machine learning models trained to predict dwell times for a shipment at a stop along a route. In practice, dwell times may have a bimodal distribution, with a first grouping of dwell times clustering around a shorter dwell time (e.g., 1 hour, 3 hours, 5 hours, etc.) while a second grouping of dwell times cluster around a longer dwell time (e.g., 8 hours, 10 hours, one day, etc.). Whether or not a specific shipment will fall into the first grouping or the second grouping often depends on when the shipment arrives at a particular stop and if the stop is in operation at that time. For example, if a shipment arrives to a stop in the morning, it may be possible for the shipment to depart the stop in only an hour or two. However, if the shipment arrives to a stop late at night, the shipment may not depart the stop until the next morning, resulting in a dwell time of 8 hours, for example. Similarly, a shipment arriving to a stop on a holiday may belong to the second group. Shipments arriving to a stop during bad weather (e.g., a snowstorm), a natural disaster, or other disaster may also belong to the second grouping. Shipments arriving to a stop that has a shortage of labor (e.g., a labor strike) may also belong to the second grouping. In some embodiments, when actual dwell times tend towards having a bimodal distribution, the machine learning model may include two sub-machine learning models, each trained on training data that correspond to one of the two groupings of training data. As such, a first sub-machine learning model may be trained to predict dwell times clustering around the low end of the bimodal distribution (i.e., the first grouping) and a second sub-machine learning model may be trained to predict dwell times clustering around the high end of the bimodal distribution (i.e., the second grouping). For a given stop, determining whether the first sub-machine learning model or the second sub-machine learning model is most appropriate for predicting dwell time may be dependent on when the shipment arrives to the stop (e.g., during operating hours, outside of operating hours, on a holiday, on a weekend) or conditions associated with the stop (e.g., a hurricane, a rainstorm, a labor shortage, etc.). While the example of bimodal dwell time behavior is provided, it should be understood that in some instances, the distribution could be trimodal, quadmodal, etc. and accordingly could have three sub-machine learning models, four sub-machine learning models, etc. It is also worth noting that for a given machine learning model, the associated sub-machine learning models do not have to all be the same type of model. For example, a machine learning model may include a first sub-machine learning model that is a decision tree and a second sub-machine learning model that is a random forest.

Exemplary Signal Diagram

Figure 4:
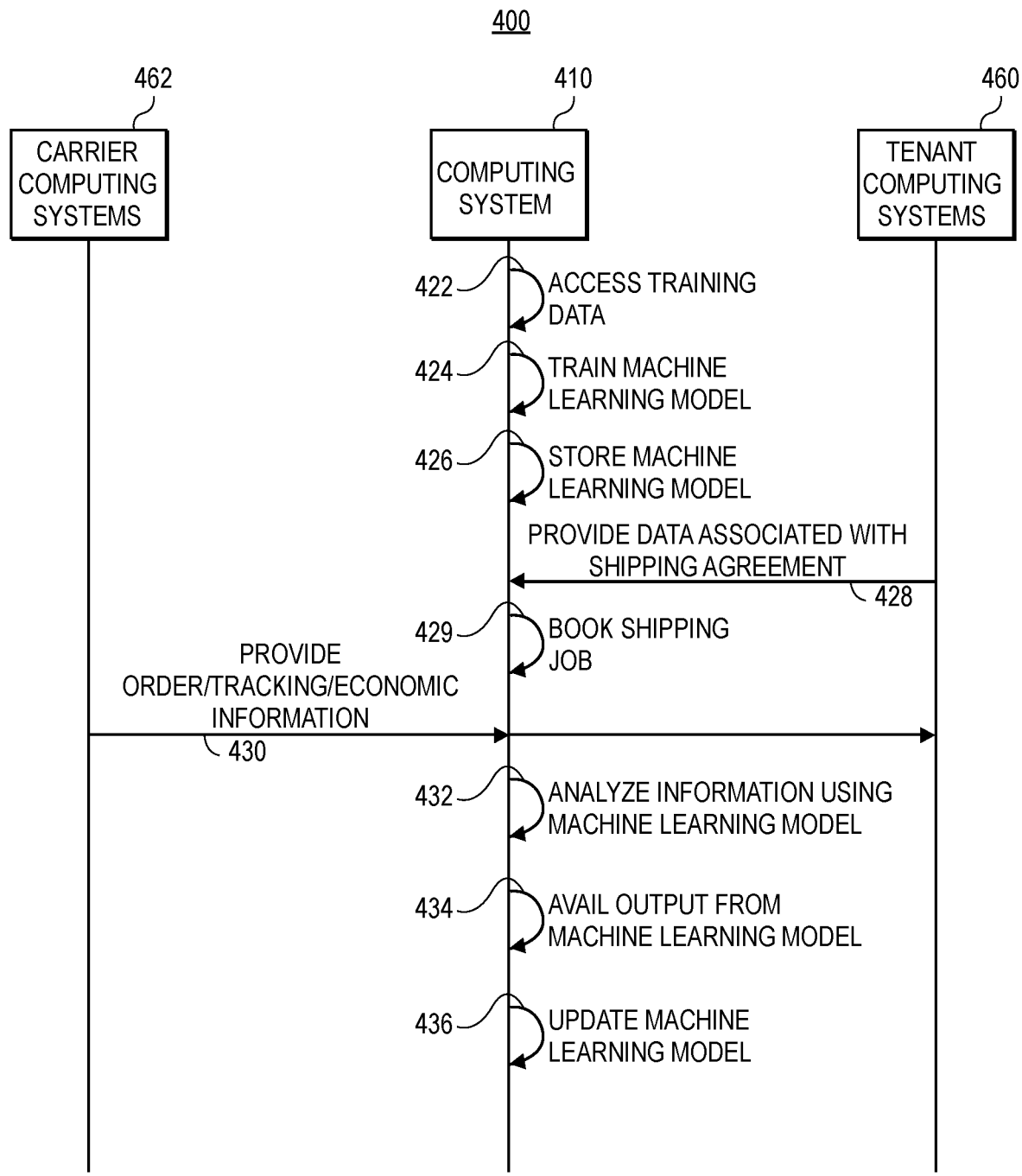
FIG. 4 depicts an exemplary signal diagram associated with using machine learning to predict dwell times for stops of shipments along routes, in accordance with some embodiments.

FIG. 4 depicts a signal diagram 400 with various functionalities associated with the described embodiments. The signal diagram 400 may be implemented by hardware or software that may be the same as or similar to hardware or software included in the system 100 of FIG. 1. The signal diagram 400 includes the following components: one or more carrier computing systems 462, a computing system 410, and one or more shipper computing systems 460. According to embodiments, the carrier computing system(s) 462 may be associated with one or more carrier entities, although, in some embodiments, the carrier computing systems 462 could in addition or in alternative be one or more stop computing systems, transportation management systems or other data vendors. Further, the computing system 410 may be, for example, the computing system 110 as described with respect to FIG. 1 and may implement the DTP application 140. Additionally, the shipper computing systems 460 may be, for example, the shipper computing systems 160 as described with respect to FIG. 1. Additionally, the carrier computing systems 462 may be, for example, the carrier computing systems 162 as described with respect to FIG. 1.

Although the signal diagram 400 is described as employing artificial intelligence and machine learning to implement and facilitate various of the functionalities, it should be appreciated that the signal diagram 400 may operate without artificial intelligence or machine learning. In this regard, the signal diagram 400 may access information/data (e.g., route data) from the carrier computing system(s) 462 and perform calculations on the information/data to determine relevant output data (e.g., predicted dwell time).

The signal diagram 400 may start with the computing system 410 training a machine learning model. In particular, the computing system 410 may access (422) training data. Generally, the training data may include: (i) training route data of one or more training routes, and (ii) training dwell time data corresponding to the training route data, one or both of which may be real-world data or simulated, labeled data.

Generally, a given shipment undergoes a set of milestones from agreement of the carrier entity to organize shipping to delivery of and payment for the shipping agreement, which may predict estimated time of arrival to the destination or one or more stops. Further, it should be appreciated that the shipper may specify or define certain dates or milestones.

Generally, a shipment may be segmented into one or more shipments (i.e., a first shipment may be for a first subset of an asset, and a second shipment may be for a second subset of the asset). Therefore, a shipment may be a partial shipment or a full shipment. Further, a shipment may be segmented into a multi-leg shipment (i.e., from an origin to a destination via at least one intermediate stop). Additionally, a shipment may be single mode (i.e., transported from an origin to a destination using a single mode of transportation) or multimodal (i.e., transported from an origin to a destination using multiple modes of transportation).

According to embodiments, the shipment statuses may indicate, for each shipment associated with a given shipping agreement, whether that shipment is early, late, or on-time, and may additionally indicate an estimated time of arrive (ETA) for that shipment. Further, the shipment statuses may indicate predicted dwell times at one or more stops along the route of the shipment.

The computing system 410 may train (424) the machine learning model (e.g., the machine learning model 130 of FIG. 1 or the model 300 of FIG. 3) using the training data. It should be appreciated that the computing system 410 may train the machine learning model using any combination of one or more techniques, calculations, or the like. The computing system 410 may store (426) the machine learning model, for example in the memory 128 as discussed with respect to FIG. 1.

Before, during, or after the computing system 410 trains the machine learning model, the shipper computing systems 460 may provide (428) data associated with a desired shipping agreement to the computing system 410. The data provided at (428) may be considered route data. According to embodiments, the data may include information associated with the shipping agreement that the shipper would like performed, where the information may identify the goods or products to be shipped (including physical dimensions or a weight of the goods/products), an origin, a destination, a desired pickup time from the origin, a desired delivery time to the destination, pricing, shipping insurance information, or other information.

The computing system 410 may accordingly book (429) or finalize the shipping agreement according to the shipping agreement information (e.g., route data) provided in (428). In particular, the computing system 410 may interface with the carrier entity that accepts the shipping agreement according to the shipping agreement information, where the carrier entity may be associated with or interface with one or more of the carrier computing system(s) 462. Accordingly, after the shipping agreement is booked or finalized, a shipping agreement may be deemed to have been reached, and the selected carrier entity may carry out or fulfill the shipping agreement according to the requested parameters and for the specified price/cost. Additionally, it may not be known which vehicle associated with the carrier entity is actually going to pick up, transport, and deliver the products, and it also may not be known how the products are being shipped (e.g., single or multi-leg, single or multimodal, partial of full shipments, etc.).

Before, during, or after the actual transporting of the products, the carrier computing system(s) 462 may provide (430) order/tracking/economic information associated with the shipping agreement to the computing system 410.

In some embodiments, the order milestones for the shipping agreement may be various associated dates, including an order submission date, a supplier ready date, and an original or intended due date. According to an implementation, various or all of the order milestones for the shipping agreement may be provided by the shipper computing systems 460 at (428).

Further, the shipment statuses may indicate (or the computing system 410 may derive from the information) whether the asset(s) for the shipping agreement are divided into partial shipments, whether each shipment is a single or multi leg shipment, and whether each shipment is a single or multimodal shipment. For example, the shipping agreement may be divided into two partial shipments, the first shipment being a single leg shipment by truck, and the second shipment being a multi leg shipment initially completed by a ship and then by a truck.

According to embodiments, the shipment statuses may include real-time tracking data for vehicles that are transporting the products, such as from electronic logging devices or location modules integrated within the vehicles. Thus, the computing system 410 may derive, from the shipment statuses and for each shipment associated with a given shipping agreement, whether the shipment is early, late, or on-time, an estimated time of arrive (ETA) for that shipment, as well as one or more actual dwell times at stops along the route of the shipment. Additionally, the computing system 410 may determine various instances of route data for each shipment which the computing system 410 may use to determine one or more predicted dwell times for the shipment.

Further, the route data may reflect differences in expected or planned route data or actual route data. According to embodiments, the planned route data may be included in the data received in (428), and the actual route data may be included in the data received in (430) and supplied by the carrier (or operators of one or more of the stops) either pre-transit or while the shipment is in transit.

The computing system 410 may compare the planned route data to the actual route data to determine any deviations, discrepancies, or the like. For example, the planned route data may indicate that a shipping agreement is to be over five stops, while the actual route data may indicate that only four stops are going to be included in the route of the shipment; accordingly, the computing system 410 may determine that the milestones (e.g., time of arrival to destination, dwell time at one or more stops, etc.) may be different in actuality than original predicted or expected.

According to embodiments, the route data provided in (430) may be associated with one or more of: the shipper, the carrier, one or more stop locations, one or more stop arrival times, the total number of stops, etc. For further example, that route data may indicate that the shipment, due to unforeseen weather events, will now be arriving at a certain stop at a 22:00, rather than 15:00, as originally expected; accordingly, the computing system 410 may need to update the predicted dwell time for the certain stop using the new arrival time to the certain stop.

The computing system 410 may analyze (432) the information (e.g., the route data) provided in (428) and (430) using the machine learning model. In particular, the computing system 410 may input, into the machine learning model, at least a portion of the route data provided in (430), which may include the route data provided in (428), which may include any combination of an identification of goods or products to be shipped (including physical dimensions or a weight of the goods/products), an origin location, a destination location, a desired pickup time, a desired delivery time, pricing, or other information associated one or more of: the shipper, the carrier, the one or more stop locations, the one or more stop arrival times, or the total number of stops.

Generally, the analysis of the machine learning model may calculate or determine predicted dwell times for shipments along routes. Dwell time may be measured as the time elapsed between an asset's arrival at a stop and its subsequent departure from the stop. A stop may be defined according to a set of coordinates and may have a corresponding geofence. The geofence may be a virtual boundary defined through one or more of: a 360-degree radius of direct ("crow-flies") distance around a set of coordinates, a specifically drawn outline defined either by a user or programmatically (e.g., a perimeter around property lines), or some other suitable virtual boundary. Accordingly, the asset may be determined to have arrived at the stop when GPS pings received from the asset indicate it is within the coordinates or the geofence boundary around the stop. The asset may be determined to have departed from the stop when the previous GPS ping received from the asset indicates the asset is inside the coordinates or the geofence, but the present GPS ping indicates the asset is now outside the coordinates or the geofence. The GPS ping may be a transmission at a specific point in time of coordinates where the asset is located and may comprise a location indication (e.g., latitude, longitude, etc.) and a timestamp.

It should be appreciated that any thresholds describing predicted dwell times may be default values or specified by a user or administrator (e.g., an individual associated with the carrier). For example, the machine learning model may output predicted dwell time probabilities indicating a 65% probability that the actual dwell time will be under 3 hours and a 90% probability that the actual dwell time will be under 5 hours. It should be appreciated that the computing system 410 may perform the machine learning model analysis on a continuous basis as additional data (e.g., the data received in (430)) is provided.

The computing system 410 may avail (432) the output from the machine learning model. According to embodiments, the computing system 410 may update a status of the shipping agreement based on the output, and may update an associated dashboard, account, interface, or the like. For example, if the output indicates that the shipment has less than some percentage (e.g., 70%) probability of departing from a given stop within 24 hours, then a dashboard may "flag" that shipment for review or follow up by a user. Similarly, a dashboard may be divided into different sections, each one having a different probability range. For example, a "red" section may include shipments with less than a 50% chance of departing a given stop within 24 hours, a "yellow" section may include shipments with a 50%-80% chance of departing a given stop within 24 hours, and a "green" section may include shipments with greater than 80% chance of departing a given stop within 24 hours.

In this regard, users may review the dashboard to assess which shipments may need to be followed up on or need some type of manual, automatic, or dynamic intervention due to one or more corresponding dwell times. For example, if a given shipping agreement has a less than 50% chance of departing a given stop within 24 hours, the computing system 410 may automatically generate and send an electronic communication (e.g., email or text message) to an appropriate entity that indicates details associated with the given stop and identifies any issues associated with the given stop and potential interventions or ways to address the issues. It should be appreciated that the thresholds, dashboard information, communication content and transmission, and other information and functionalities are automatically defined or configurable by a user.

It should be appreciated that the computing system 410 may be configured to generate any type of notification, electronic message (e.g., email, text message, etc.), or the like in association with processing the output from the machine learning model. Additionally, the computing system 410 may transmit or communicate the notification or message via any type of electronic delivery medium, network, or the like. Further, the notification or message may include various graphical or textual content for the associated user to review.

The computing system 410 may update (436) the machine learning model based on the analysis of the data and output resulting therefrom. In this regard, the machine learning model may be continuously updated as new data is received and analyzed. For example, after an asset leaves a stop and the corresponding actual dwell time for the stop is known, the actual dwell time can be compared to a dwell time that was previously predicted for the stop to evaluate the accuracy of the machine learning model's prediction. In this manner, actual dwell time data may be used in a similar manner as holdout data is used when validating a trained model. Sufficiency criteria applied in evaluating the performance of the machine learning model may vary depending upon the size of the data (e.g., training data or actual data) available for training, the performance of previous iterations of scoring algorithms, or user-specified performance requirements. If the machine learning model does not meet the sufficiency criteria, the machine learning model may be adjusted in one or more manners. For example, one or more weights of the machine learning model may be adjusted, the machine learning model may train on additional training data (e.g., route data), a different architecture or type of machine learning model may be selected, or some other suitable change to the machine learning model.

Exemplary Graphical Interface

FIG. 5 is an example interface 500 associated with a plurality of shipments. The interface 500 (or a representation of the information/data included in the interface 500) may be displayed on a graphical user interface, such as the display 124 of FIG. 1. In some embodiments, the plurality of shipments may all correspond to a single carrier and a single shipper, in which case one or more users of a shipper entity or a carrier entity may view the interface 500, using a computing device. In some embodiments, the plurality of shipments may correspond to a single carrier and a plurality of shippers, in which case one or more users of the carrier entity may view the interface 500, using a computing device. In some embodiments, the plurality of shipments may correspond to a plurality of carriers and a single shipper, in which case one or more users of the shipper entity may view the interface 500, using a computing device. Additionally, a server (e.g., the computing device 110) may generate or determine the information included in the interface 500, as discussed herein. It should be appreciated that the interface 500 is merely an example, and that additional or alternative information is envisioned such as, for example, carrier identification, shipper identification, vehicle identification, current location of the shipments, or other information.

Generally, the interface 500 may indicate current and planned shipments. As illustrated in FIG. 5, the interface 500 may include, for each shipment, a shipment overview that includes the following information: a shipment identifier (shipment number, as illustrated), asset information (products being transported, as illustrated), origin location (city name, as illustrated), destination location (city name, as illustrated), and estimated time of arrival (date, as illustrated). It should be appreciated that alternative and additional information is envisioned. According to embodiments, a machine learning model may determine the fulfillment likelihood based on the analyses techniques as discussed herein, and a server may generate the interface 400 and information included therein.

As illustrated in FIG. 5, the interface 500 may include, for each shipment, plurality of stop overviews that each include the following information: stop location (city name, as illustrated), an estimated time of arrival to the stop (date and time, as illustrated), an estimated time of departure from the stop (date and time, as illustrated), and a predicted dwell time (number of hours, as illustrated). As illustrated, each of the shipments have N number of stops; however, this is only for illustrative purposes. In effect, each of the shipments of the interface 500 may have a different number of stops (although, in some embodiments, it is possible that one or more of the shipments of the interface 500 may have the same number of stops).

The user may review the interface 500 to ascertain predicted dwell times for the plurality of shipments. For example, row 510, corresponding to Shipment #710 may be indicated as having a predicted dwell time of 43 hours at Stop 1 in Boise, Idaho. The predicted dwell time of the Shipment #710 at Stop 1 may be longer (as compared with the other predicted dwell times in the interface 500) because, for example, the Shipment #710 is predicted to arrive at Stop 1 on Nov. 24, 2022, Thanksgiving Day. Accordingly, the Boise stop may be closed for Thanksgiving Day (and the day after), resulting in a longer predicted dwell time. As illustrated, an alert 520 may be displayed for the Shipment #710 to indicate to the user that the predicted dwell time is longer than a certain threshold (e.g., 24 hours).

The interface 500 may further include a set of selections to contact or communicate with relevant entities associated with the shipment. For example, as illustrated the interface 500 includes a contact control 530 that the user may select. According to embodiments, in response to the user selecting the contact control 530, the server may identify any entities associated with the shipment (e.g., a carrier entity, or an operator of the corresponding stop), and transmit a set of electronic communications (which may be automatically generated, or manually generated, by the user, for example) to any identified entities. In some embodiments, the interface 500 may display a set of contact information associated with any identified entities in response to the user selecting the contact control 530. Thus, the server (e.g., the computing device 110) or a user may initiate various actions in an attempt to determine and address potential issues associated with one or more shipments.

Exemplary Method for Predicting Dwell Time

Figure 6:
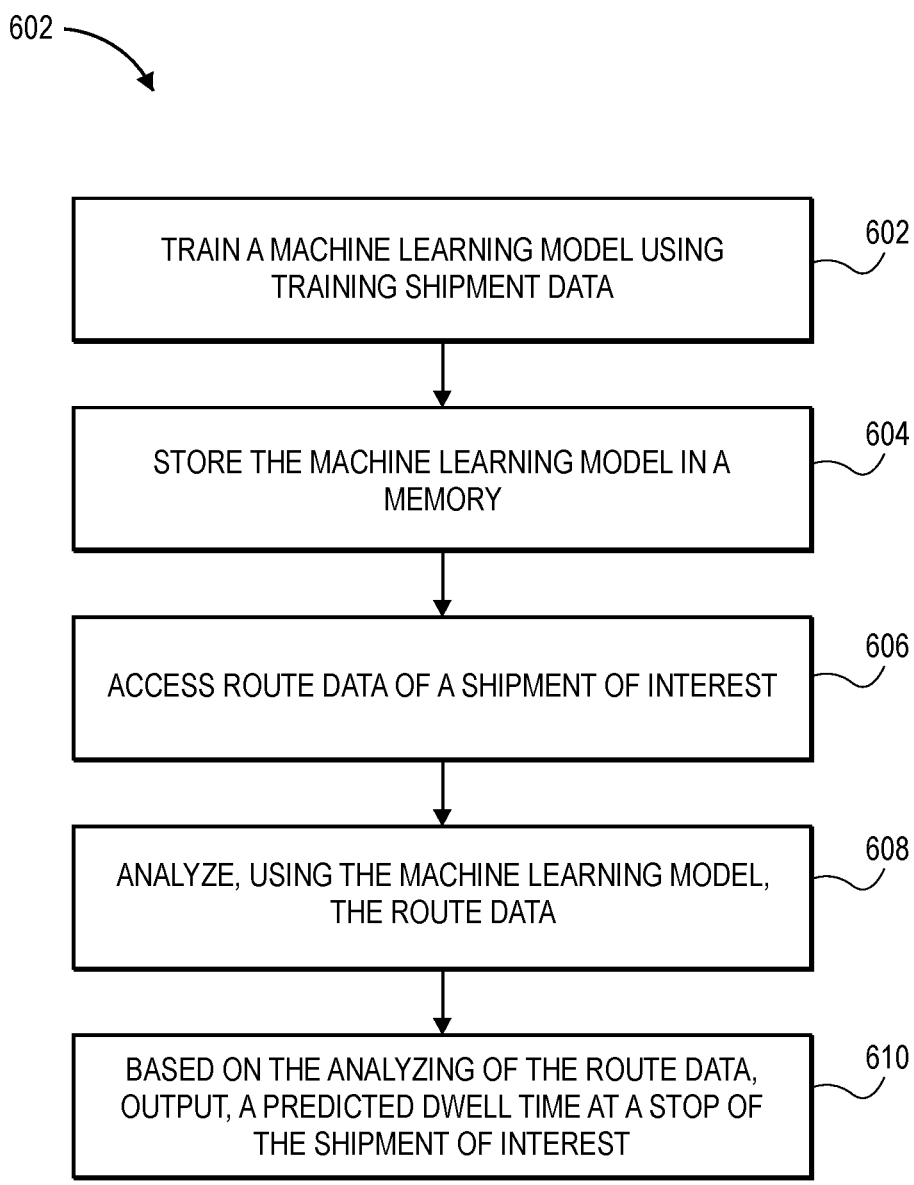
FIG. 6 illustrates an example flow diagram of using machine learning to predict dwell times for stops of shipments along routes, in accordance with some embodiments.

FIG. 6 depicts is a block diagram of an example method 600 of using machine learning to predict dwell times for shipments along routes. The method 600 may be facilitated by an electronic device (such as the computing device 110 as depicted in FIG. 1) part of a system (such as the system 100 depicted in FIG. 1) that may further include training data sources (such as the training route data sources 150 depicted in FIG. 1) and one or more external systems (such as the shipper computing systems 160, the carrier computing systems 162, or the stop computing systems 164 depicted in FIG. 1), all of which may communicate via a network (such as the network 170 depicted in FIG. 1). As discussed herein, it should be appreciated that the electronic device may execute or facilitate the method 600 without training or using a machine learning model, and instead access/receive data and analyze the data to generate output data. The method 600 may use a machine learning model that may be the same as or similar to the model 130 of FIG. 1 or the model 300 of FIG. 3 to predict dwell times according to a process that may be the same as or similar to the signal diagram 400 of FIG. 4. The method 600 may further utilize or implement an interface that may be the same as or similar to the interface 500 of FIG. 5 that may be presented on a graphical user interface.

The method 600 may begin when the electronic device trains (block 605) a machine learning model (e.g., the model 130 of FIG. 1) using training data. According to embodiments, the training data may include: (i) training route data of one or more training routes, and (ii) training dwell time data corresponding to the training route data. Further, the electronic device may store (block 610) the machine learning model in memory (e.g., the memory 128 of FIG. 1). In some embodiments, the machine learning model is a gradient-boosted decision tree.

Further, in some embodiments, the training route data includes a first subset of the training route data and a second subset of the training route data, wherein training dwell times corresponding to the first subset of the training route data are less than training dwell times corresponding to the second subset of the training route data. In these embodiments, the machine learning model may be comprised of a first sub-machine learning model and a second sub-machine learning model, where the training of the machine learning model includes training the first sub-machine learning model using the first subset of the training route data and training the second sub-machine learning model using the second subset of the training route data.

The electronic device may access (block 615) route data including a stop along a route for a shipment of interest. The route data may be obtained from one or more of: a shipper, a carrier, or a stop, such as via the systems 160-164 of FIG. 1. According to some embodiments, the route data may include data associated with one or more of: a shipper, a carrier, a stop location, a stop arrival time, or a total number of stops.

The electronic device may analyze (block 620), using the machine learning model, the route data that includes the stop. In embodiments with a plurality of sub-machine learning models comprising the machine learning model, using the machine learning model to analyze the route data may include selecting which at least one of the plurality of sub-machine learning models should analyze the route data. In some embodiments, selecting which at least one of the plurality of sub-machine learning models should analyze the route data is based on an arrival time (estimated or actual) to the stop of the shipment of interest.

The electronic device may, based on the analyzing, output (block 625), by the machine learning model, a predicted dwell time at the stop along the route for the shipment of interest. According to some embodiments, the predicted dwell time may be a duration (e.g., number of minutes, number of hours, number of days, etc.), a duration window (e.g., a date/time window, a window of number of hours, a minimum/maximum number of hours, etc.), a duration with a probability (e.g., a likelihood of being this duration, a likelihood of being with a duration window, etc.). Generally, dwell times may be a measure of the elapsed time between when an asset of the training shipment arrives at a stop of the training shipment and when the asset departs the stop. Arrival and departure at a stop may be determined based on a geofence around the stop. A stop may be defined according to a set of coordinates and may have a corresponding geofence. Accordingly, the asset may be determined to have arrived at the stop when GPS pings received from the asset indicate it is within the coordinates or the geofence boundary around the stop. The asset may be determined to have departed from the stop when the previous GPS ping received from the asset indicates the asset is inside the coordinates or the geofence, but the present GPS ping indicates the asset is now outside the coordinates or the geofence. The GPS ping may be a transmission at a specific point in time of coordinates where the asset is located and may comprise a location indication (e.g., latitude, longitude, etc.) and a timestamp.

Outputting (block 625), by the machine learning model, the predicted dwell time at the stop along the route for the shipment of interest may include displaying the predicted dwell time, using, for example, the display 124 and the user interface unit 146 of the computing device 110. In some embodiments, the predicted dwell time itself may be displayed, while in other embodiments a representation (e.g., a graphical representation or data visualization technique) of the predicted dwell time may be displayed. In some embodiments, outputting the predicted dwell time may include indicating warnings if the predicted dwell time satisfies certain conditions of a threshold (e.g., is greater than 3 days). In some embodiments, outputting the predicted dwell time may include playing audio that represents the predicted dwell time. The predicted dwell time for the stop may be output such that the output is receivable by one or more of: the shipper, the carrier, or the stop.

In some embodiments, the method 600 may be performed either entirely by automation, e.g., by one or more processors (e.g., a CPU or GPU) that execute instructions stored on one or more non-transitory, computer-readable storage media (e.g., a volatile memory or a non-volatile memory, a read-only memory, a random-access memory, a flash memory, an electronic erasable program read-only memory, or one or more other types of memory. The method 600 may use any of the components, processes, or techniques of one or more of FIGS. 1-5.

Additional Considerations

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," "training," "storing," "accessing," "analyzing," outputting," "selecting," "obtaining," "comparing," "adjusting," "receiving," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of using machine learning to predict dwell times for shipments along routes, the method comprising:
    training, by one or more computer processors, a first sub-machine learning model using at least: (i) a first subset of training route data of one or more training routes, and (ii) a first subset of training dwell time data corresponding to the first subset of the training route data, wherein the training route data comprises, for each of the one or more training routes, a set of training stops associated with that training route, and wherein the training dwell time data comprises a plurality of training dwell times, each of which indicates an elapsed time between when a corresponding shipment associated with the training route data arrives at a training stop of the set of training stops and when the corresponding shipment departs the training stop;
    training, by the one or more computer processors, a second sub-machine learning model using at least: (i) a second subset of the training route data of the one or more training routes, and (ii) a second subset of the training dwell time data corresponding to the second subset of the training route data, where the first subset of the training dwell time data comprises a first subset of the plurality of training dwell times that are less than a second subset of the plurality of training dwell times included in the second subset of the training dwell time data;
    storing the first sub-machine learning model and the second sub-machine learning model in a memory, wherein each of the first sub-machine learning model and the second sub-machine learning model is a gradient-boosted random forest of decision trees;
    receiving, by the one or more computer processors from an electronic logging device integrated within a vehicle associated with a shipment of interest, a set of GPS pings corresponding to a set of locations of the vehicle;
    in response to receiving the set of GPS pings, automatically determining, by the one or more processors based on the set of GPS pings, a route for the shipment of interest, including detecting, based on a portion of the set of GPS pings indicating that the vehicle is within coordinates of a geofence boundary around a stop along the route, an arrival time to the stop;
    selecting, by the one or more computer processors based on the arrival time to the stop, either the first sub-machine learning model or the second sub-machine learning model;
    analyzing, by the one or more computer processors using either the first sub-machine learning model or the second sub-machine learning model that was selected, the route data that includes the stop;
    based on the analyzing of the route data, outputting, by either the first sub-machine learning model or the second sub-machine learning model that was selected, a predicted dwell time at the stop along the route for the shipment of interest, wherein the predicted dwell time (i) predicts an elapsed time between when the shipment of interest arrives at the stop and when the shipment of interest departs the stop, and (ii) a probability of the elapsed time;
    determining, by the one or more computer processors, that the probability of the elapsed time is less than a threshold probability; and
    in response to determining that the probability of the elapsed time is less than the threshold probability:
        availing, via a visual dashboard, the probability of the elapsed time, wherein the visual dashboard comprises:
            a first section, visually distinguished by a first color, representing a first probability range and including the probability of the elapsed time, and
            a second section, visually distinguished by a second color different from the first color, representing a second probability range different from the first probability range and including at least one additional probability respectively associated with at least one additional elapsed time and respectively corresponding to at least one additional shipment of interest,
        automatically generating, by the one or more computer processors, an electronic communication that indicates a potential intervention associated with the stop, and
        automatically sending, to an entity by the one or more computer processors, the electronic communication.

2. The computer-implemented method of claim 1, further comprising:
    obtaining, at the one or more computer processors, (i) holdout route data of a holdout shipment, and (ii) a holdout dwell time corresponding to the holdout route data;
    analyzing, by the one computer processors using either the first sub-machine learning model or second sub-machine learning model that was selected, the holdout route data;
    based on the analyzing of the holdout route data, outputting, by either the first sub-machine learning model or the second sub-machine learning model that was selected, a predicted holdout dwell time;
    comparing, by the one or more computer processors, the predicted holdout dwell time to the holdout dwell time; and
    based on the comparing of the predicted holdout dwell time to the holdout dwell time, adjusting, by the one or more computer processors, one or more weights of either the first sub-machine learning model or the second sub-machine learning model.

3. The computer-implemented method of claim 1, further comprising:
    receiving, by the one or more computer processors, a location of interest corresponding to the shipment of interest, wherein the location of interest is subsequent to the stop for the shipment of interest; and determining, by the one or more computer processors, an estimated time of arrival (ETA) for the shipment of interest to the location of interest based on the predicted dwell time at the stop.

4. The computer-implemented method of claim 3, wherein the location of interest is an additional stop for the shipment of interest, and wherein the computer-implemented method further comprises:

analyzing, by the one or more computer processors using either the first sub-machine learning model or the second sub-machine learning model that was selected, the ETA for the shipment of interest to the additional stop; and based on the analyzing of the ETA, outputting, by either the first sub-machine learning model or the second sub-machine learning model that was selected, an additional predicted dwell time at the additional stop for the shipment of interest.

5. The computer-implemented method of claim 1, wherein one or both of the training route data or the route data include data associated with two or more of: a shipper, a carrier, a stop location, a planned stop arrival time, an observed stop arrival time, an observed stop departure time, or a total number of stops.

6. A computer system for using machine learning to predict dwell times for shipments along routes, the method comprising:

one or more processors;

a program memory coupled to the one or more processors and storing executable instructions that, when executed by the one or more processors, cause the computer system to:

train a first sub-machine learning model using at least:
(i) a first subset of training route data of one or more training routes, and (ii) a first subset of training dwell time data corresponding to the first subset of training route data, wherein the training route data comprises, for each of the one or more training routes, a set of training stops associated with that training route, and wherein the training dwell time data comprises a plurality of training dwell times, each of which indicates an elapsed time between when a corresponding shipment associated with the training route data arrives at a training stop of the set of training stops and when the corresponding shipment departs the training stop, train a second sub-machine learning model using at least (i) a second subset of the training route data of the one or more training routes, and (ii) a second subset of the training dwell time data corresponding to the second subset of the training route data, where the first subset of the training dwell time data comprises a first subset of the plurality of training dwell times that are less than a second subset of the plurality of training dwell times included in the second subset of the training dwell time data, store the first sub-machine learning model and the second sub-machine learning model in the program memory, wherein each of the first sub-machine learning model and the second sub-machine learning model is a gradient-boosted random forest of decision trees, receive, from an electronic logging device integrated within a vehicle associated with a shipment of interest, a set of GPS pings corresponding to a set of locations of the vehicle, in response to receiving the set of GPS pings, automatically determine, based on the set of GPS pings, a route for the shipment of interest including detecting, based on a portion of the set of GPS pings indicating that the vehicle is within coordinates of a geofence boundary around a stop along the route, an arrival time to the stop, select, based on the arrival time to the stop, either the first sub-machine learning model or the second sub-machine learning model, analyze, using either the first sub-machine learning model or the second sub-machine learning model that was selected, the route data that includes the stop, based on the analyzing of the route data, output, by either the first sub-machine learning model or the second machine learning model that was selected, a predicted dwell time at the stop along the route for the shipment of interest, wherein the predicted dwell time (i) predicts an elapsed time between when the shipment of interest arrives at the stop and when the shipment of interest departs the stop, and (ii) a probability of the elapsed time, determine that the probability of the elapsed time is less than a threshold probability, and in response to determining that the probability of the elapsed time is less than the threshold probability:

avail, via a visual dashboard, the probability of the elapsed time, wherein the visual dashboard comprises:

a first section, visually distinguished by a first color, representing a first probability range and including the probability of the elapsed time, and a second section, visually distinguished by a second color different from the first color, representing a second probability range different from the first probability range and including at least one additional probability respectively associated with at least one additional elapsed time and respectively corresponding to at least one additional shipment of interest, automatically generate an electronic communication that indicates a potential intervention associated with the stop, and automatically send, to an entity, the electronic communication.

7. The computer system of claim 6, wherein the executable instructions further cause the computer system to:

obtain (i) holdout route data of a holdout shipment, and (ii) a holdout dwell time corresponding to the holdout route data;

analyze, using either the first sub-machine learning model or second sub-machine learning model that was selected, the holdout route data;

based on the analyzing of the holdout route data, output, by either the first sub-machine learning model or the second sub-machine learning model that was selected, a predicted holdout dwell time;

compare the predicted holdout dwell time to the holdout dwell time; and based on the comparing of the predicted holdout dwell time to the holdout dwell time, adjust one or more weights of either the first sub-machine learning model or the second sub-machine learning model.

8. The computer system of claim 6, wherein one or both of the training route data or the route data include data associated with two or more of: a shipper, a carrier, a stop location, a planned stop arrival time, an observed stop arrival time, an observed stop departure time, or a total number of stops.

9. The computer system of claim 6, wherein the executable instructions further cause the computer system to:
   receive a location of interest corresponding to the shipment of interest, wherein the location of interest is subsequent to the stop for the shipment of interest; and
   determine an estimated time of arrival (ETA) for the shipment of interest to the location of interest based on the predicted dwell time at the stop.

10. A tangible, non-transitory computer-readable medium storing executable instructions for using machine learning to predict dwell times for shipments along routes that, when executed by one or more processors of a computer system, cause the computer system to:
    train a first sub-machine learning model using at least: (i) a first subset of training route data of one or more training routes, (ii) a first subset of training dwell time data corresponding to the first subset of training route data, wherein the training route data comprises, for each of the one or more training routes, a set of training stops associated with that training route, and wherein the training dwell time data comprises a plurality of training dwell times, each of which indicates an elapsed time between when a corresponding shipment associated with the training route data arrives at a training stop of the set of training stops and when the corresponding shipment departs the training stop;
    train a second sub-machine learning model using at least: (i) a second subset of the training route data of the one or more training routes, and (ii) a second subset of the training dwell time data corresponding to the second subset of the training route data, where the first subset of the training dwell time data comprises a first subset of the plurality of training dwell times that are less than a second subset of the plurality of training dwell times included in the second subset of the training dwell time data;
    store the first sub-machine learning model and second sub-machine learning model in a memory, wherein each of the first sub-machine learning model and the second sub-machine learning model is a gradient-boosted random forest of decision trees;
    receive, from an electronic logging device integrated within a vehicle associated with a shipment of interest, a set of GPS pings corresponding to a set of locations of the vehicle;
    in response to receiving the set of GPS pings, automatically determine, based on the set of GPS pings, a route for the shipment of interest including detecting, based on a portion of the set of GPS pings indicating that the vehicle is within coordinates of a geofence boundary around a stop along the route, an arrival time to the stop;
    select, based on the arrival time to the stop, either the first sub-machine learning model or the second sub-machine learning model;
    analyze, using either the first sub-machine learning model or the second sub-machine learning model that was selected, the route data that includes the stop;
    based on the analyzing of the route data, output, by either the first sub-machine learning model or the second sub-machine learning model that was selected, a predicted dwell time at the stop along the route for the shipment of interest, wherein the predicted dwell time (i) predicts an elapsed time between when the shipment of interest arrives at the stop and when the shipment of interest departs the stop, and (ii) a probability of the elapsed time;
    determine that the probability of the elapsed time is less than a threshold probability; and
    in response to determining that the probability of the elapsed time is less than the threshold probability:
        avail, via a visual dashboard, the probability of the elapsed time, wherein the visual dashboard comprises:
            a first section, visually distinguished by a first color, representing a first probability range and including the probability of the elapsed time, and
            a second section, visually distinguished by a second color different from the first color, representing a second probability range different from the first probability range and including at least one additional probability respectively associated with at least one additional elapsed time and respectively corresponding to at least one additional shipment of interest,
        automatically generate an electronic communication that indicates a potential intervention associated with the stop, and
        automatically send, to an entity, the electronic communication.

11. The tangible, non-transitory computer-readable medium of claim 10, wherein the executable instructions further cause the computer system to:
    obtain (i) holdout route data of a holdout shipment, and (ii) a holdout dwell time corresponding to the holdout route data;
    analyze, using either the first sub-machine learning model or the second sub-machine learning model that was selected, the holdout route data;
    based on the analyzing of the holdout route data, output, by either the first sub-machine learning model or the second sub-machine learning model that was selected, a predicted holdout dwell time;
    compare the predicted holdout dwell time to the holdout dwell time; and
    based on the comparing of the predicted holdout dwell time to the holdout dwell time, adjust one or more weights of either the first sub-machine learning model or the second sub-machine learning model.

12. The tangible, non-transitory computer-readable medium of claim 10, wherein the executable instructions further cause the computer system to:
    receive a location of interest corresponding to the shipment of interest, wherein the location of interest is subsequent to the stop for the shipment of interest; and
    determine an estimated time of arrival (ETA) for the shipment of interest to the location of interest based on the predicted dwell time at the stop.

* * * * *